US010156135B2

(12) United States Patent
Li et al.

(10) Patent No.: US 10,156,135 B2
(45) Date of Patent: Dec. 18, 2018

(54) PHASE COMPENSATED FIXED-POINT NUMERICALLY CONTROLLED OSCILLATOR FOR DOWNHOLE LOGGING

(71) Applicant: Halliburton Energy Services, Inc., Houston, TX (US)

(72) Inventors: Peng Li, Houston, TX (US); William J. Schaecher, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/554,142

(22) PCT Filed: Apr. 8, 2015

(86) PCT No.: PCT/US2015/024912
§ 371 (c)(1),
(2) Date: Aug. 28, 2017

(87) PCT Pub. No.: WO2016/164010
PCT Pub. Date: Oct. 13, 2016

(65) Prior Publication Data
US 2018/0066512 A1    Mar. 8, 2018

(51) Int. Cl.
*G01V 3/00*        (2006.01)
*E21B 47/12*    (2012.01)
(Continued)

(52) U.S. Cl.
CPC ............... *E21B 47/12* (2013.01); *G06F 1/02* (2013.01); *G06F 1/0328* (2013.01)

(58) Field of Classification Search
None
See application file for complete search history.

(56) References Cited

U.S. PATENT DOCUMENTS

| 4,241,308 A | 12/1980 | Lovelace et al. |
| 4,636,734 A | 1/1987 | Genrich |

(Continued)

FOREIGN PATENT DOCUMENTS

| CN | 101854172 | 10/2010 |
| EP | 1357460 | 10/2003 |

OTHER PUBLICATIONS

Napier , "Push Numerically Controlled Oscillators Beyond their Limits", EDN Network, Sep. 12, 1997, 9 pages.
(Continued)

*Primary Examiner* — Adolf Dsouza
(74) *Attorney, Agent, or Firm* — Kilpatrick Townsend & Stockton LLP

(57) ABSTRACT

Systems and methods are provided for generating a phase compensated numerically controlled signal using a fixed-point algorithm. In one example, a method includes receiving, at a downhole device, parameters including an input frequency and a compensation value. The method further includes converting, based on the parameters, the input frequency to a delta phase value. The method also includes calculating, with the downhole device, an accumulation error for a digital signal. In response to determining that the accumulation error is greater than or equal to the compensation value, the method removes the accumulation error from the digital signal to generate an output signal.

20 Claims, 9 Drawing Sheets

(51) Int. Cl.
*G06F 1/02* (2006.01)
*G06F 1/03* (2006.01)

(56) References Cited

U.S. PATENT DOCUMENTS

| | | | |
|---|---|---|---|
| 5,329,260 A | 7/1994 | Poplin | |
| 5,574,374 A | 11/1996 | Thompson et al. | |
| 5,673,212 A | 9/1997 | Hansen | |
| 5,724,396 A | 3/1998 | Claydon et al. | |
| 6,424,185 B1 | 7/2002 | Wolf | |
| 6,429,693 B1 | 8/2002 | Staszewski et al. | |
| 6,703,837 B1* | 3/2004 | Wisler | G01V 3/28 324/335 |
| 7,557,619 B1 | 7/2009 | Dick et al. | |
| 7,570,725 B1 | 8/2009 | Ciccone et al. | |
| 7,826,582 B2 | 11/2010 | Kuhns et al. | |
| 8,120,400 B2 | 2/2012 | Gendai | |
| 8,275,087 B2 | 9/2012 | Hadzic et al. | |
| 8,674,777 B1 | 3/2014 | Mack et al. | |
| 8,704,604 B2 | 4/2014 | Schoepf et al. | |
| 2002/0180613 A1* | 12/2002 | Shi | E21B 47/18 340/853.1 |
| 2003/0063700 A1 | 4/2003 | Tzou et al. | |
| 2008/0069284 A1 | 3/2008 | Kuhns et al. | |
| 2008/0205494 A1 | 8/2008 | Whitehead et al. | |
| 2010/0158181 A1 | 6/2010 | Hadzic | |
| 2012/0093244 A1 | 4/2012 | Levi et al. | |
| 2012/0176174 A1 | 7/2012 | Webb, III | |
| 2014/0198834 A1 | 7/2014 | Boritzki | |

OTHER PUBLICATIONS

International Patent Application No. PCT/US2015/024912, "International Search Report and Written Opinion", dated Dec. 7, 2015, 10 pages.

* cited by examiner

PHASE COMPENSATED FIXED-POINT NUMERICALLY CONTROLLED OSCILLATOR FOR DOWNHOLE LOGGING

TECHNICAL FIELD

The present disclosure relates generally to techniques for generating a phase compensated, fixed-point, numerically controlled signal and, more specifically, to a numerically controlled oscillator (NCO).

BACKGROUND

Oilfield operations can require a great quantity of information relating to the parameters and conditions encountered downhole. Downhole logging tools can collect or log such information by performing 'logging while drilling' (LWD) or wireline logging. With wireline logging, a probe or 'sonde' is lowered into the borehole after some or the entire well has been drilled. The sonde can hang at the end of a long cable or 'wireline' that provides mechanical support to the sonde as well as providing an electrical connection between the sonde and electrical equipment located at the surface of the well. With LWD, the drilling assembly includes sensing instruments that measure various parameters as an earth formation is being penetrated. While LWD allows more contemporaneous formation measurements, drilling operations result in environments where large or resource intensive electronic instrumentation and sensors are typically not desirable.

A numerically controlled oscillator (NCO) is a digital signal generator that creates a synchronous (e.g., clocked), discrete-time, discrete-valued representation of a waveform, where the waveform is typically sinusoidal. An NCO can be used in conjunction with a digital-to-analog converter (DAC) to create an analog output signal. An NCO can be used in communications and signal processing instruments. An NCO offers high output bandwidth, fine frequency resolution, and fast tuning speed. For many use cases and applications, such as oilfield operations, the phase drift and jitter of an NCO is desired to be extremely small, such that NCO designs are very complex.

An NCO can generate a frequency and phase tunable output signal with a precision fixed-frequency clock. In time domain, the output frequency of an NCO is a function of the system clock. In the realization of an NCO, there are two conflicting aspects to that need to be addressed, namely phase accuracy and resource consumption. In order to maintain acceptable levels of phase accuracy at high frequencies, resource and power consumption usually needs to be very high. Conversely, in order to reduce or minimize resource and power consumption, usually NCOs sacrifice phase accuracy.

DETAILED DESCRIPTION

Figure 1:
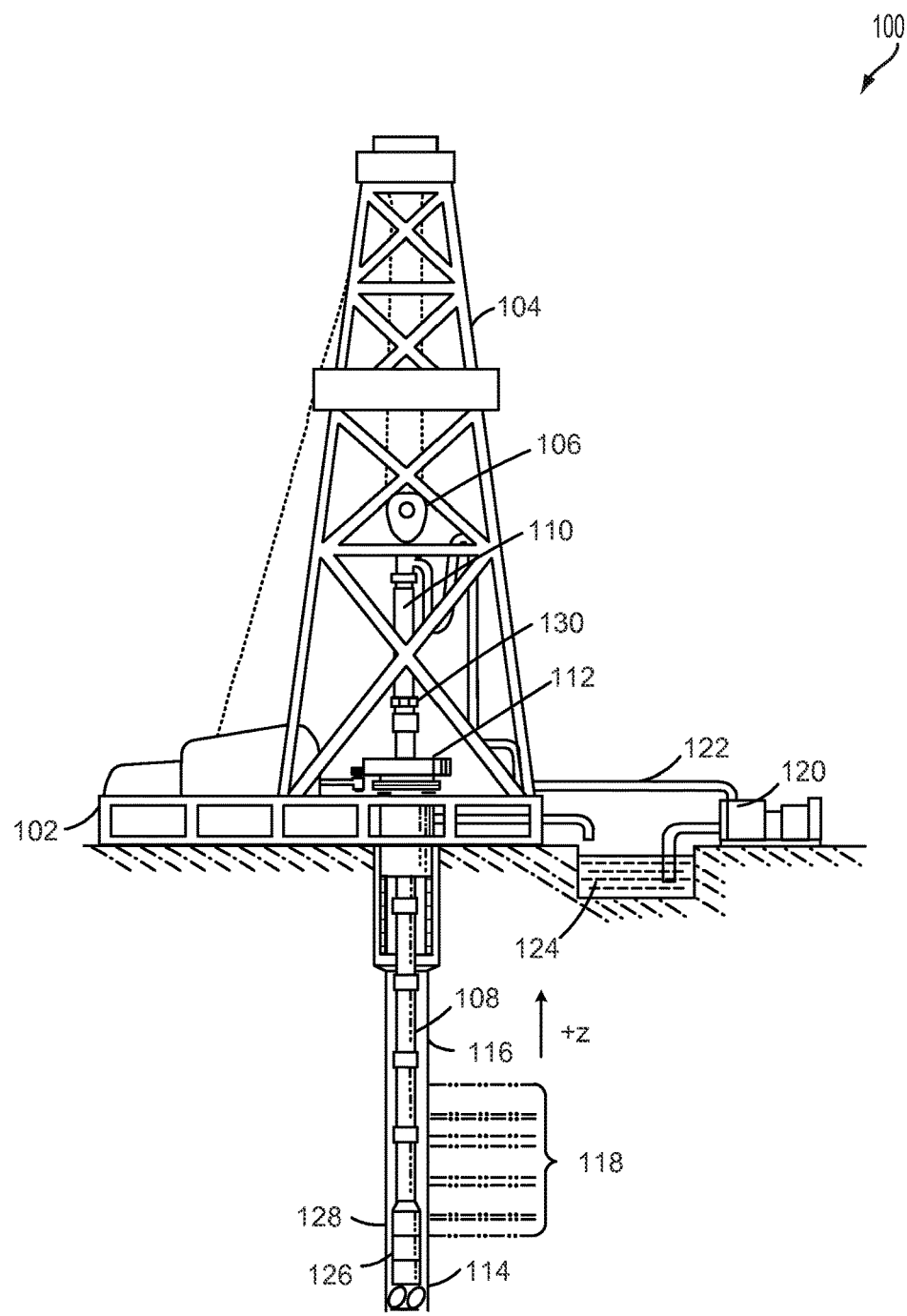
FIG. 1 is a schematic diagram of a logging while drilling (LWD) environment, according to certain illustrative examples of the present disclosure.

Certain aspects and features relate to a numerically controlled oscillator (NCO) system configured to be used for downhole logging. Illustrative examples and related methodologies of the present disclosure are described below as they might be employed in an NCO system that uses a fixed-point design to minimize resource usage without sacrificing accuracy. In certain embodiments, a compensation technique corrects or compensates for phase error and phase drift. An efficient fixed-point NCO is provided that maintains high precision output while also reducing power and resource consumption of the NCO. The techniques can be used with any downhole devices that require numerically controlled oscillations. For example, the techniques can be used with downhole logging tools.

Methods and systems are provided for automatically generating numerically controlled signals with high precision while also minimizing computational resource usage and power consumption. According to certain embodiments, this is achieved through the separation of real-time and non-real-time parts of the system, the implementation of a fixed-point NCO algorithm, and an efficient method of phased compensation.

An example NCO includes a phase compensator that requires very little system resources because the phase compensator simply uses a counter and a comparator. The NCO can allocate calculation of a compensation value into a non-real-time configuration module. The NCO increases precision with only a relatively small resource consumption increase. In certain cases where the calculated compensation value is not an integer, additional compensation counters can be implemented to further increase the precision of the NCO.

In certain examples, the NCO is firmware based. In other examples, the NCO is hardware based. In one aspect of the present disclosure, the NCO is implemented as an integrated circuit having logic gates and RAM blocks such as, for example, a field-programmable gate array (FPGA). For example, the NCO may be implemented as an FPGA having registers, adders/counters, a digital comparator, and a digital-to-analog converter (DAC).

Certain aspects relate to an NCO that quickly and efficiently produces a signal output by eliminating the requirement for a large number of registers or gates. The NCO produces a highly accurate signal output as required for high numerical precision by minimizing phase drift and jitter. In this context, phase drift is a difference between a true sine or cosine function that an NCO is trying to calculate and the actual signal output by the NCO. When phase drift occurs, the signal output from the NCO device does not match the true sine or cosine function at a given point in time. That is, phase drift represents the difference between the true sine or cosine function that an NCO seeks to calculate and what the NCO can actually calculate. Phase drift is a numerical inaccuracy that manifests itself as a shift or error as compared to a sine or cosine function such that the signal output from the NCO is incorrect as compared to a sine or cosine function at a point in time. Jitter refers to sporadic inaccuracies in a calculated output of a sine or cosine function. For example, jitter can occur when a signal output sporadically jumps around at random points in time with respect to actual values of a sine or cosine function. By using a relatively small number of gates as compared to more complex FPGAs, example embodiments reduce the amount of computational resources and power needed to produce the signal output, while still maintaining high phase accuracy and low jitter without requiring a lot of numerical resolution and numerical accuracy. That is, certain examples quickly produce an accurate signal output with low phase drift using relatively few computations and resources.

In one example, an NCO system architecture includes a real-time component and a non-real-time component. With this architecture, an efficient, yet complex monitor can be included in downhole devices, such as, for example, downhole logging tools. In one example, the NCO system can be used for nuclear magnetic resonance (NMR) imaging.

Illustrative examples described herein provide an efficient fixed-point NCO design with phase compensation in order to guarantee that a phase error of the NCO falls within specified system requirements. In certain embodiments, a fixed-point NCO implementation may be configured to reduce resource consumption, and an efficient phase compensation method is used to guarantee an acceptable level of phase accuracy. The NCO may be configured to guarantee acceptable levels of phase accuracy at high frequencies while keeping the resource requirements relatively low. That is, the NCO can provide high levels of phase accuracy at high frequencies without requiring large amounts of power or computational resources (e.g., memory, storage, and processing power). Examples of the architecture and logic of such an NCO implementation is described in detail with reference to FIGS. 3 and 4 below. In one example, the NCO is embodied as a digital device configured to generate a continuous sine or cosine function with a phase drift that falls within a pre-determined threshold for error tolerance or error margin.

The design of the NCO can be included in any electronic system, including electronic systems used in oilfield environments. For example, the NCO can be used in logging while drilling (LWD) environments and measurement while drilling (MWD) environments. In one embodiment, the NCO can be included in an electronic system used for intelligent completions to monitor and control wells. In certain embodiments, the NCO can be used as a component of various electronic systems such as intelligent completion systems used to optimize well production by collecting, transmitting, and analyzing completion, production, and reservoir data.

Examples of Logging Environments

FIG. 1 shows an illustrative logging while drilling (LWD) environment 100. A drilling platform 102 supports a derrick 104 having a traveling block 106 for raising and lowering a drill string 108. A kelly 110 supports the drill string 108 as it is lowered through a rotary table 112. A drill bit 114 is driven by a downhole motor or rotation of the drill string 108. As bit 114 rotates, it can create a borehole 116 that passes through various earth formations 118. A pump 120 circulates drilling fluid through a feed pipe 122 to kelly 110, downhole through the interior of drill string 108, through orifices in drill bit 114, back to the surface via the annulus around drill string 108, and into a retention pit 124. The drilling fluid transports cuttings from the borehole into the retention pit 124 and aids in maintaining the borehole integrity.

A LWD resistivity imaging tool 126 (e.g., a logging tool 126) may be integrated into the bottom-hole assembly near the bit 114. As the bit extends the borehole through the formations, logging tool 126 may collect or log measurements relating to various formation properties as well as the bit position, and various other drilling conditions. The logging tool 126 may take the form of a drill collar, such as a thick-walled, tubular collar that provides weight and rigidity to aid the drilling process. In certain embodiments, the logging tool 126 may include an NCO. Since the environment 100 can be a high temperature environment, the NCO is configured to use limited resources. For example, the NCO can be implemented as a relatively simple FPGA that limits power consumption and efficiently calculates an output signal. According to certain embodiments, the logging tool 126 is a downhole logging tool including an NCO that is capable of operating in in high temperature environments while minimizing usage of electrical power and computational resources without reducing the level of precision of its output signal.

A telemetry sub 128 may be included to transfer logging tool measurements to a surface receiver 130 and to receive commands from the surface receiver. At various times during the drilling process, the drill string 108 may be removed from the borehole.

Figure 2:
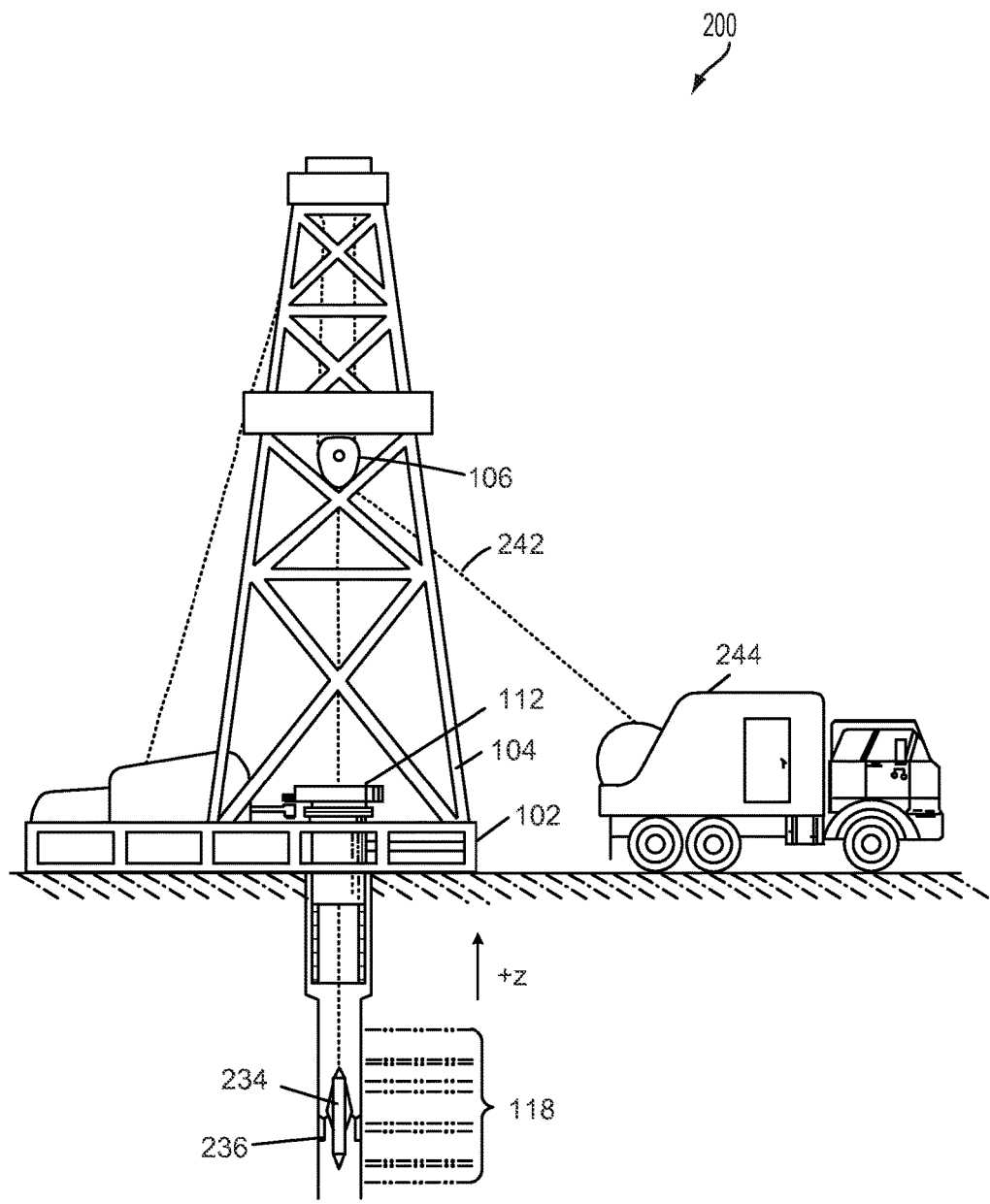
FIG. 2 is a schematic diagram of a wireline logging environment, according to certain illustrative examples of the present disclosure, according to certain illustrative examples of the present disclosure.

FIG. 2 shows an illustrative wireline logging environment 200. As shown in FIG. 2, once the drill string has been removed, logging operations can be conducted using a wireline logging tool 234. The wireline logging tool 234 can be implemented as a downhole logging tool including a sensing instrument sonde suspended by a cable 242 having conductors for transporting power to the wireline logging tool 234 and telemetry from the tool to the surface. A resistivity imaging portion of the wireline logging tool 234 may have sensing pads 236 configured to slide along the borehole wall as the logging tool 234 is pulled uphole. As depicted in FIG. 2, logging facility 244 may collect measurements from the logging tool 234, and can include computing devices configured to process and store the measurements gathered using the downhole logging tool. In certain embodiments, the downhole logging tool can include an NCO. Since environment 200 is a space constrained environment, the NCO included in the downhole logging tool will have a relatively small size. For example, the NCO can be implemented as an FPGA that fits within the space confines of logging tool 234.

Environments 100 and 200 can be high-pressure, high temperature environments. For example, the logging tool 126 in environment 100 and the wireline logging tool 234 in environment 200 may be expected to be robust against high temperatures (e.g., temperatures approaching or exceeding 185 degrees Fahrenheit) and high pressure (e.g., approximately 20,000 pounds per square inch/psi). Additionally, in environments 100 and 200, logging tool 126 and wireline logging tool 234 may be subjected to corrosive fluids and severe mechanical shocks at depths of more than 3 miles. In order to obtain and log data from such extreme environments, logging tool 126 and wireline logging tool 234 may have limitations in terms of size and power. As a result, logging tool 126 and wireline logging tool 234 may be configured to be efficient in terms of power consumption and to be relatively small.

Example of System Architecture

Figure 3:
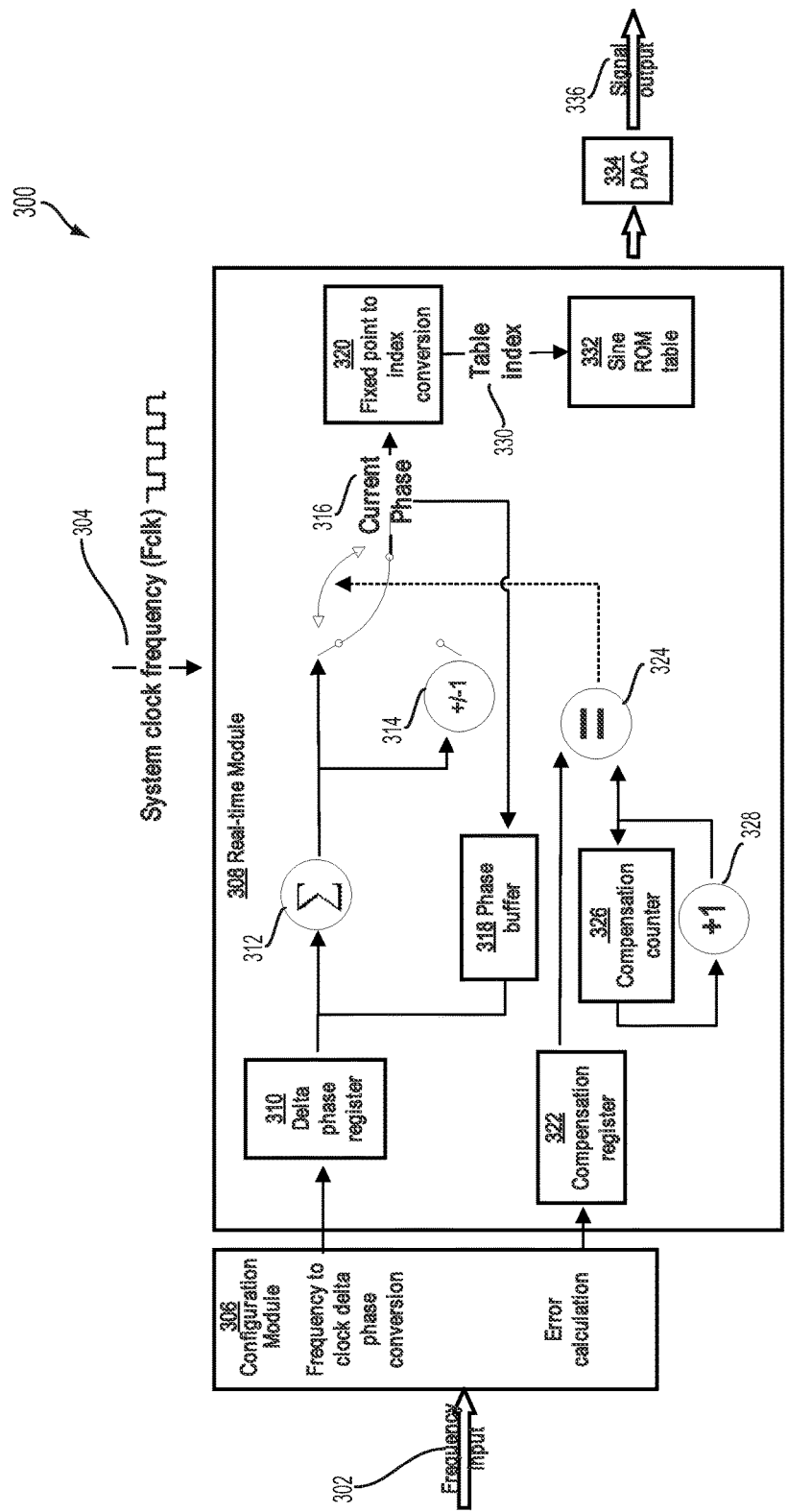
FIG. 3 is a block diagram of a system architecture for a fixed-point numerically controlled oscillator (NCO), according to certain illustrative examples of the present disclosure.

FIG. 3 illustrates an architecture of an example system 300 for a fixed-point NCO with low resource consumption. As shown in FIG. 3, the system 300 consists of two modules, a configuration module 306, and a real-time module 308. The configuration module 306 is configured to receive command input, frequency input 302, and to calculate setup register values. The real-time module 308 is configured to calculate a phase value and to generate an actual signal output 336. One benefit of separation the NCO system 300 into modules 306 and 308 is that the real-time module 308 is isolated with respect to the non-real-time components such as the configuration module 306. The real-time module 308 is configured to be extremely efficient with every clock cycle (e.g., each cycle of system clock frequency 304) in order to generate a valid signal output 336. On the other hand, the non-real-time configuration module 306 does not have to perform calculations within one clock cycle of system clock frequency 304. By separating the configuration and real-time components into separate modules 306 and 308, and executing system 300 at a lower speed, system 300 can save computing resources and reduce its power consumption. Due to the reduced need for computing resources and power, system 300 can be incorporated into a downhole systems and devices. For example, system 300 can be used with the logging tools described above with reference to the downhole environments 100 and 200 depicted in FIGS. 1 and 2.

The frequency input 302 and other inputs into the configuration module 306 are not real-time feedback or real-time parameters. Instead, these inputs represent a desired precision, a frequency a user is trying to reach, and a tolerable margin of error. In some examples, such inputs can be provided via user interaction with a user interface and input/output (I/O) devices. For example, a user can provide the configuration module 306 with input parameters including a frequency input 302, and then the configuration module 306 can convert the frequency input 302 to a clock delta phase value. This frequency to clock delta phase conversion may be performed in a non-real time manner. The frequency input 302 can represent the frequency that a user wants system 300 to reach.

In the example depicted in FIG. 3, the configuration module 306 also performs error calculation. The error calculated with the configuration module 306 can represent the error margin that the system 300 can afford or tolerate. The configuration module 306 can calculate what a sine wave would be with a lower resolution than what is required by system 300, and then model the error that would result from that lower resolution. This calculation and error modeling is performed separately from calculations carried out using real-time module 308. In one example, the configuration module 306 calculates how a tolerable error margin should be reflected, and provides parameters to a compensation register 322 of the real-time module 308 so that the real-time module 308 can compensate for the error margin. After determining parameters, performing frequency-to-clock delta phase conversion, and calculating an error margin, the configuration module 306 can provide this information as a configuration to the real-time module 308.

As shown in the example of FIG. 3, the configuration module 306 can feed the calculated error margin into compensation register 322 of real-time module 308 so that real-time module 308 can subtract the calculated error out of its output before producing the final signal output 336. The real-time module 308 can also load the converted delta phase value into delta phase register 310 and load the calculated error margin or tolerance into a compensation register 322. After receiving configuration parameters including the converted delta phase and error tolerance, the real-time module 308 can carry out the NCO function in order to generate the final, low phase drift signal output 336.

In the example provided in FIG. 3, there are two main parts within the real-time module 308. One part, shown in the upper portion of real-time module 308, includes a phase accumulator with components 312, 314, 316, and 318, which calculate the NCO function. The other part, shown in the lower portion of real-time module 308, includes a compensation module and real-time compensation components 324, 326, and 328 that act as a phase compensator that compensates for the calculated error tolerance. Together, these two parts produce a signal output 336 having a low phase drift that is within the calculated error tolerance. The components of these two parts are described in the following paragraphs.

One part of the real-time module 308 is a phase accumulator. The phase accumulator starts with a received delta phase value stored in delta phase register 310, and then calculates a phase increment delta phase using summation block 312 and block 314. Next, the phase accumulator determines a current phase at block 316, and stores a value in phase buffer 318. At block 314, the phase accumulator can increment or decrement the value stored in phase buffer 318 as needed. In one example, block 314 can be implemented using an adder or counter of an FPGA. In certain embodiments, the phase increment delta phase can be calculated using the following equation:

$$DeltaPhase = \frac{Fsig * TableLen}{Fclk}$$

In the above equation, Fsig stands for the desired signal, TableLen corresponds to a sine table length, and Fclk stands for the digital system clock frequency. As shown in FIG. 3, Fclk can be received by the real-time module 308 as the system clock frequency 304. The system clock frequency 304 can correspond to a clock speed of an actual real-time clock. In order to reduce system resource consumption, the delta phase value can be set up to have a fixed-point format. For example, the integer length of the delta phase value can be directly related to a sine table length, while the fractional length of the delta phase value can determine the phase precision. Since the precision of the fixed-point format is directly determined by the length of the fractional length, a higher fractional length will result in a higher phase precision. However, a higher fractional length can also result in higher system resource consumption.

To mitigate the need for higher resource consumption by system 300, for every clock cycle of system clock frequency 304, the phase accumulator can be increased by the delta phase value using block 314. The result of increasing the phase accumulator may be equivalent to progressing or advancing a sine wave by the delta phase value.

If it is determined at block 316 that the value calculated with the phase accumulator corresponds to the current phase, control is passed to block 320. Otherwise, the value is stored in the phase buffer 318. In block 320, the output may be converted back into an integer value for table indexing. With this approach, only a fixed-point accumulator is consumed, and the resource consumption of system 300 can be minimized. As shown in FIG. 3, table indexing 330 can be performed using a sine lookup table 332. In the example of FIG. 3, the sine lookup table 332 can be stored in read only memory (ROM) of system 300. By properly designing the fractional length size of sine lookup table 332, the phase precision of system 300 can be achieved and maintained within a limited amount of time. After the table indexing is complete, the digital NCO output signal is outputted. In one example, if an analog output signal is needed, the digital NCO output signal is passed to a digital-to-analog converter (DAC) 334. According to this example, the DAC 334 converts digital NCO signal to an analog signal output 336.

As noted above, the second part of the real-time module 308 is the compensation module, which includes real-time compensation components 324, 326, and 328 that compensate for the calculated error tolerance. Once system 300 starts processing, for every clock cycle of system clock frequency 304, a free running counter may be incremented by 1. In the example of FIG. 3, the free running counter is stored using compensation counter 326 and incremented at block 328. In one example, block 328 can be implemented using an adder or counter of an FPGA. When system 300 determines that the free running counter has reached the value of a pre-calculated or pre-determined compensation value, an increment or decrement will be carried out on the phase buffer. This increment or decrement can be performed at block 314 of the phase accumulator, which is discussed above. As shown in the example of FIG. 3, the running counter can be compared to the compensation value at block 324. In one example, block 324 can be implemented using a digital comparator. If the compensation value is calculated as an integer, the phase buffer will never have an accumulation larger than one least significant bit (LSB).

The accumulation error due to the fixed-point precision used in system 300 is fixed in each accumulation, and the error can be calculated upon the calculation of the delta phase value. In system 300, this error is converted into a count value with respect to the system clock frequency 304. The count value represents the number of clock cycles it takes for the error to increase by one fixed-point LSB. In one example, the LSB is represents a least significant bit of the phase accumulator. This compensation value is loaded into a pre-allocated compensation register 322 along with the delta phase value. In certain embodiments, a fixed-point compensation value is used because compensation register 322 works with integers. However, with floating point values for an actual error and a fixed-point, integer compensation value, an error can accumulate or increase over time. That is, a first compensation module can introduce its own error, which can be addressed by one or more additional compensation modules.

In cases where the compensation value is not an integer, a second or even a higher number of compensation modules can be implemented to further increase the precision of the system 300. For example, system 300 can include multiple compensation modules with respective compensation counters 326 working in parallel. In such cases where the compensation value is not an integer, since the actual error can be a floating point number, additional error compensation may be needed to reach a lower error level. In this example, the compensation value represents an uncorrected error and the compensation value is a catch up value.

Example of a Process

Figure 4:
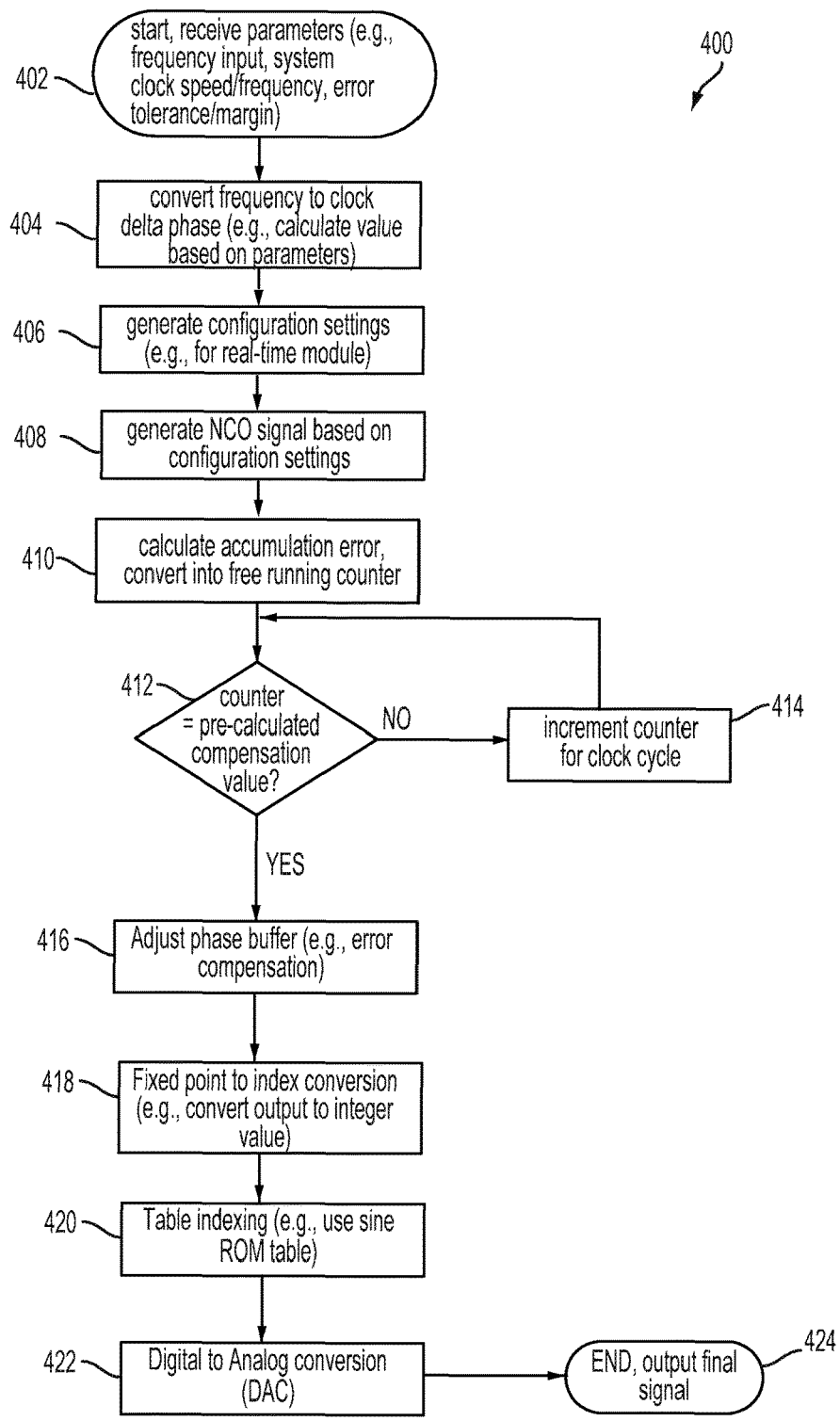
FIG. 4 is a flow chart illustrating a method for efficient phase compensation that guarantees phase accuracy, according to certain illustrative aspects of the present disclosure.

In view of the foregoing description, one illustrative method will now be described with reference to the flow chart of FIG. 4. The method 400 depicted in FIG. 4 is described with reference to the features of FIG. 3. However, the method 400 is not limited to those features. The order of the blocks presented in FIG. 4 can be varied. For example, the blocks of method 400 can be re-ordered, combined, and/or broken into sub-blocks. The blocks may be performed in serial, in parallel, or in some other manner. In addition, certain blocks may be omitted in some implementations.

As shown in FIG. 4, method 400 begins at block 402. In one example, block 402 includes receiving parameters. Such parameters may include, for example, frequency input (e.g., frequency input 302), a system clock speed/frequency, and a calculated error tolerance or error margin. In one example, block 402 includes calculating an error tolerance or margin. In an example, block 402 can be performed with the configuration module 306 described above with reference to FIG. 3. For example, the error tolerance or margin can be calculated with the configuration module 306.

At block 404, a frequency is converted to a clock delta phase value. As shown in FIG. 4, block 404 can include calculating the delta phase value based on parameters received in block 402. In one example, block 404 can be performed using the configuration module 306. After the delta phase value is calculated, control is passed to block 406 where configuration settings are generated. As shown, block 406 can include generating configuration settings for a real-time module. In one example, the real-time module is the real-time module 308 described above with reference to FIG. 3. After the configuration settings are generated, control is passed to block 408.

At block 408, an NCO signal is generated. As shown, the NCO signal is based on the configuration settings generated at block 406. In one example, block 408 is performed with components of the real-time module 308 described above with reference to FIG. 3. The NCO signal generated at block 408 is a digital signal. If an analog output signal is needed, the NCO signal can be converted with DAC 334 to produce an analog signal such as the signal output 336.

Next, at block 410, an accumulation error is calculated, and this is converted into free running counter. In one example, block 410 is performed using components of a compensation module, such as compensation register 322 and compensation counter 326 described above with reference to FIG. 3.

Then, at block 412, a determination is made as to whether the free running counter is greater than or equal to a pre-calculated or pre-determined compensation value. If it is determined that the running counter is equal to the compensation value, control is passed to block 416. Otherwise, if it is determined that the counter is still less than the compensation value, control is passed to block 414 where the counter is incremented for the current clock cycle. In an example, the incrementing in block 414 can be performed with adder 328 described above with reference to FIG. 3. After the counter is incremented, control is passed back to block 412.

At block 416, a phase buffer is adjusted. As shown in the example of FIG. 4, block 416 can include error compensation. In one example, phase buffer 318 is used to store the adjusted phase buffer calculated at block 416. After the phase buffer is adjusted, control is passed to block 418, where fixed-point to index conversion is performed. Block 418 can include converting an output signal to an integer value. After the conversion, control is passed to block 420.

At block 420, table indexing is performed. In one example, block 420 can include the table indexing 330 using the sine lookup table 332 described above with reference to FIG. 3. After the table indexing, the digital output signal is available. If an analog output signal is needed, control can be passed to optional block 422 where digital-to-analog conversion is performed on the output signal. Optional block 422 can be carried out using a digital-to-analog converter (DAC), such as, for example DAC 334. After the digital-to-analog conversion, control is passed to block 424, where the final output signal is output and the method 400 completes. In one example, the final signal output in block 424 is the signal output 336 described above with reference to FIG. 3.

By carrying out the blocks shown in FIG. 4, the method 400 calculates a sine wave with a lower resolution than what is actually required and then models the error that would result from that lower resolution separately, and then feeding in, based on the configuration parameters received in block 402, what the calculated error tolerance is so that the calculated error tolerance can be subtracted out of the final signal output before the method completes in block 424. In this way, the method 400 achieves efficient phase compensation that guarantees phase accuracy.

Examples of NCO Outputs

Figure 5:
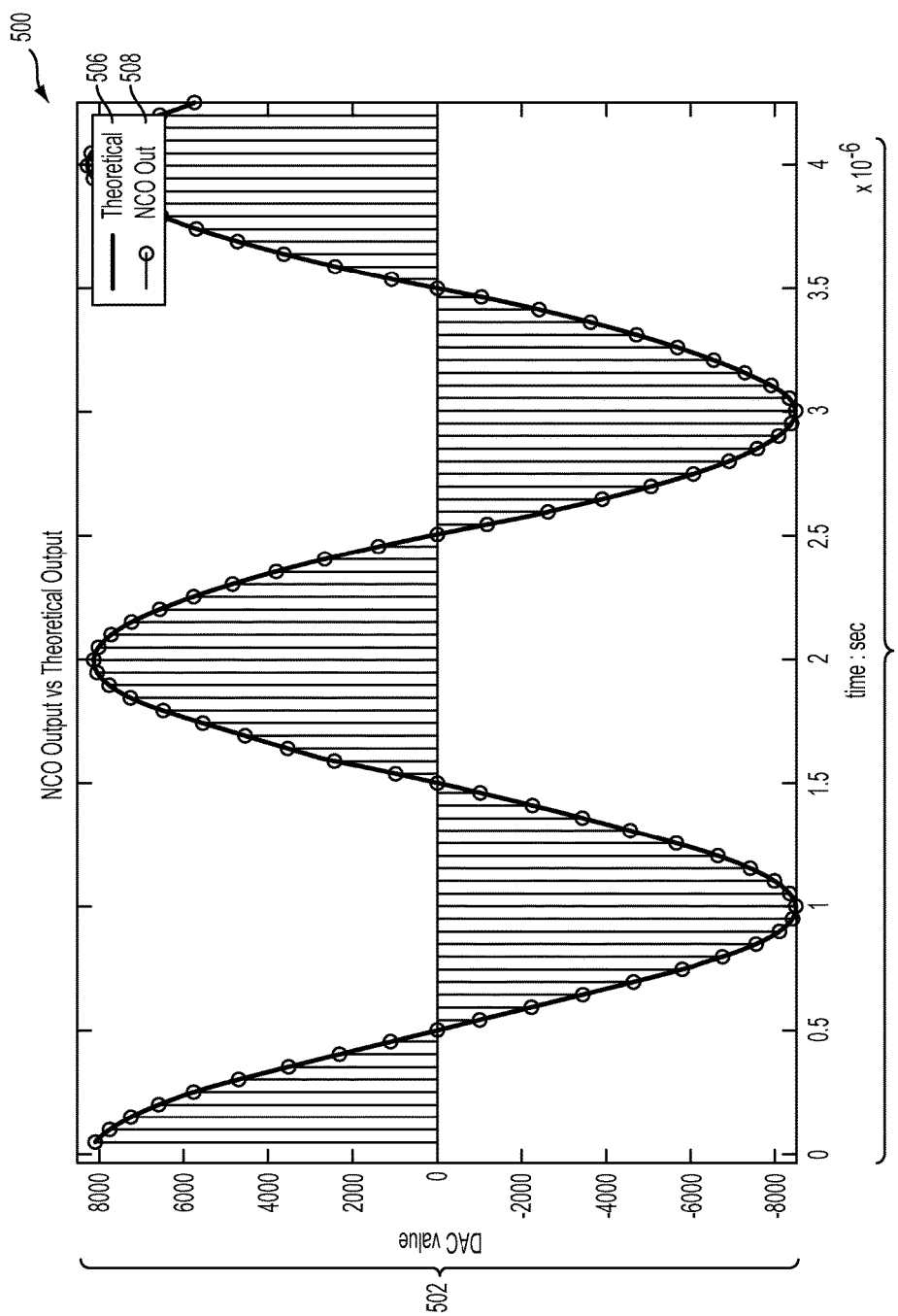
FIG. 5 shows a fixed-point NCO output, according to certain illustrative examples of the present disclosure.

An example output 500 of a fixed-point NCO is depicted in FIG. 5. As shown in the example of FIG. 5, the output 500 can plot a DAC value 502 of a theoretical output signal 506 and a lower resolution NCO output signal 508 over a limited period of time 504. In FIG. 5, the theoretical output signal 506 is a direct cosine output signal, and the NCO output signal 508 is the actual NCO output. As shown, initially, there is shows no drift of NCO output signal 508 with respect to the theoretical output signal 506 within the time period 504. In the example of FIG. 5, by using a fixed-point NCO, phase precision between a theoretical signal value 506 and an NCO output signal 508 can be maintained within the period of time 504.

Figure 6:
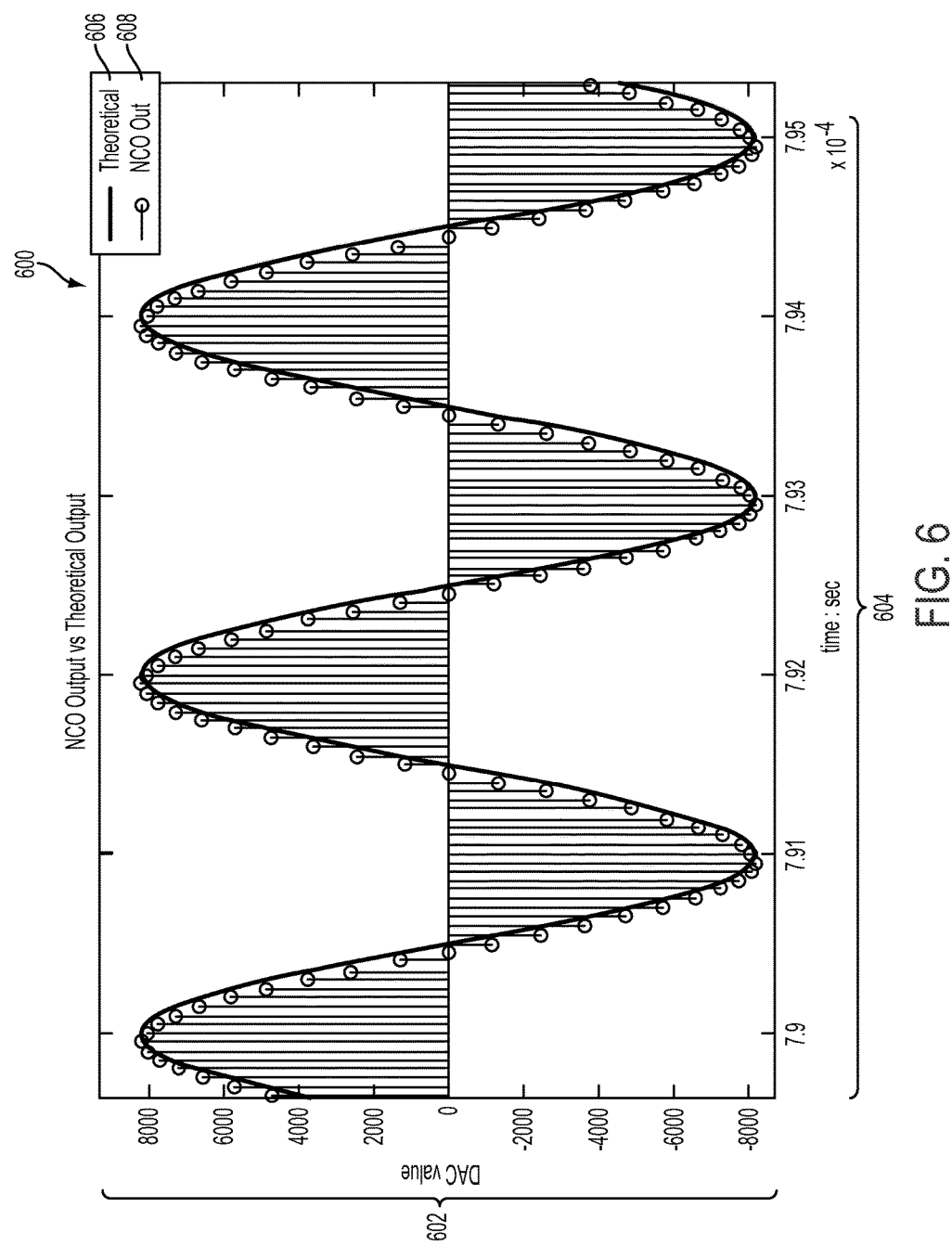
FIG. 6 shows a long time NCO output, according to certain illustrative examples of the present disclosure.

FIG. 6 depicts an example output 600 of an NCO over a long time period 604 when there is insufficient error compensation. As shown, an error in NCO output 608 can accumulate over time period 604. The output 600 shows how, although the fixed-point design using configuration module 306 and real-time module 308 can minimize resource consumption, the precision of the fixed-point format may be limited over an extended period of time. Moreover, some residual error may be accumulated with every phase accumulation operation. Over a long period of time such as time period 604, the accumulation error can show up and can result in the NCO output 608 being out of phase with respect to a theoretical output 606. As can be seen in FIG. 6, without adequate error compensation, the NCO output 608 can start to lose its phase fidelity with respect to theoretical output 606 over a long period of time 604.

Figure 7:
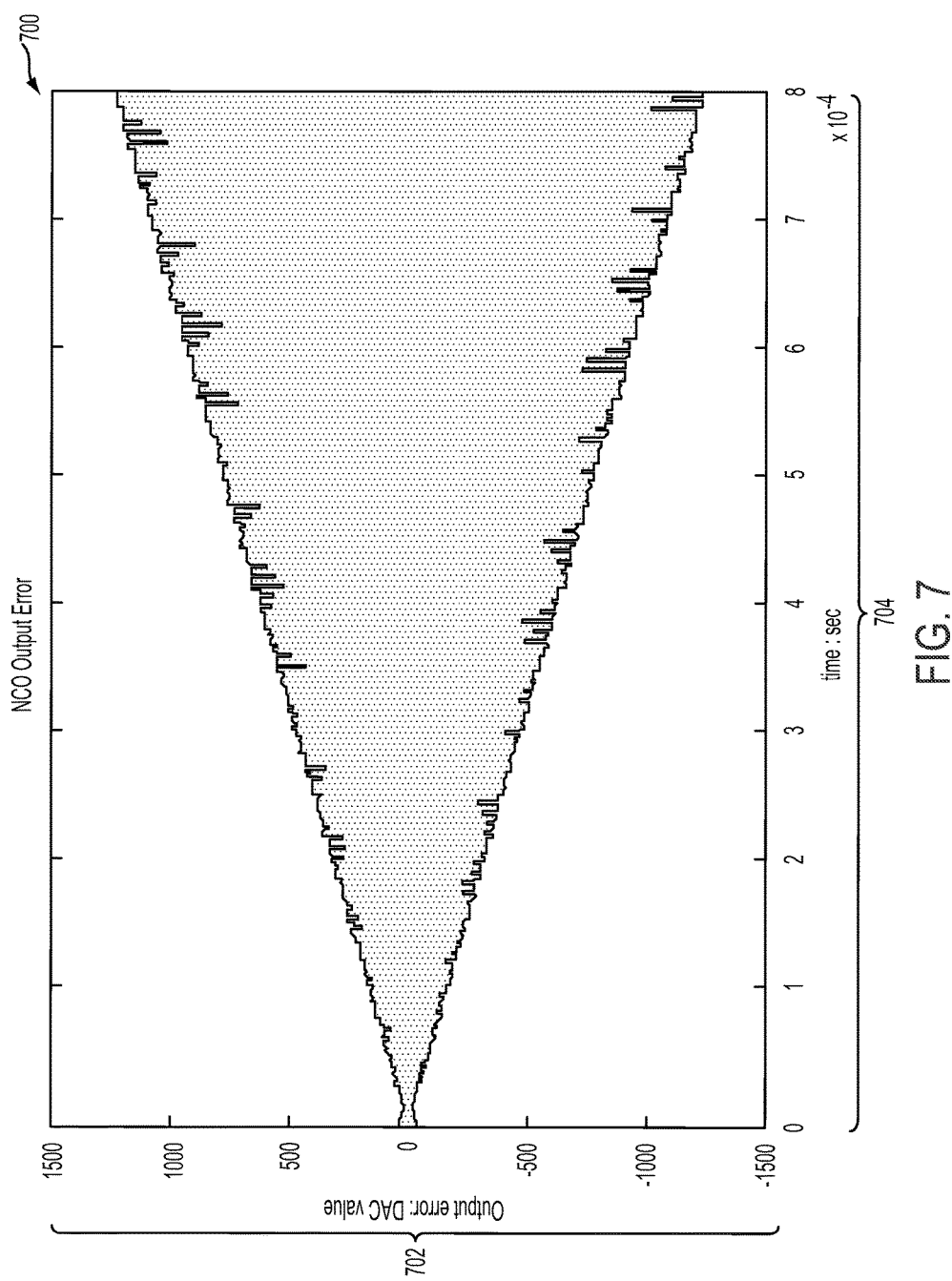
FIG. 7 shows NCO error over time, according to certain illustrative examples of the present disclosure.

FIG. 7 shows accumulated NCO output error 700. In particular, FIG. 7 shows how the DAC value 702 of the NCO output error 700 can accumulate over a period of time 704. The NCO output error 700 can arise due to fixed-point precision used by the NCO. This error can increase over time 704 as an accumulation error. Such an accumulation error is fixed in each accumulation, and it can be calculated upon the calculation of the delta phase value. The efficient phase compensation method and the two module approach discussed above with reference to FIGS. 3 and 4 can be used to compensate for the phase accumulation error shown in FIG. 7. With this approach, instead of accumulating an error such as the NCO output error 700 that increases over time 704, the error can be limited while also maintaining low system resource consumption.

Figure 8:
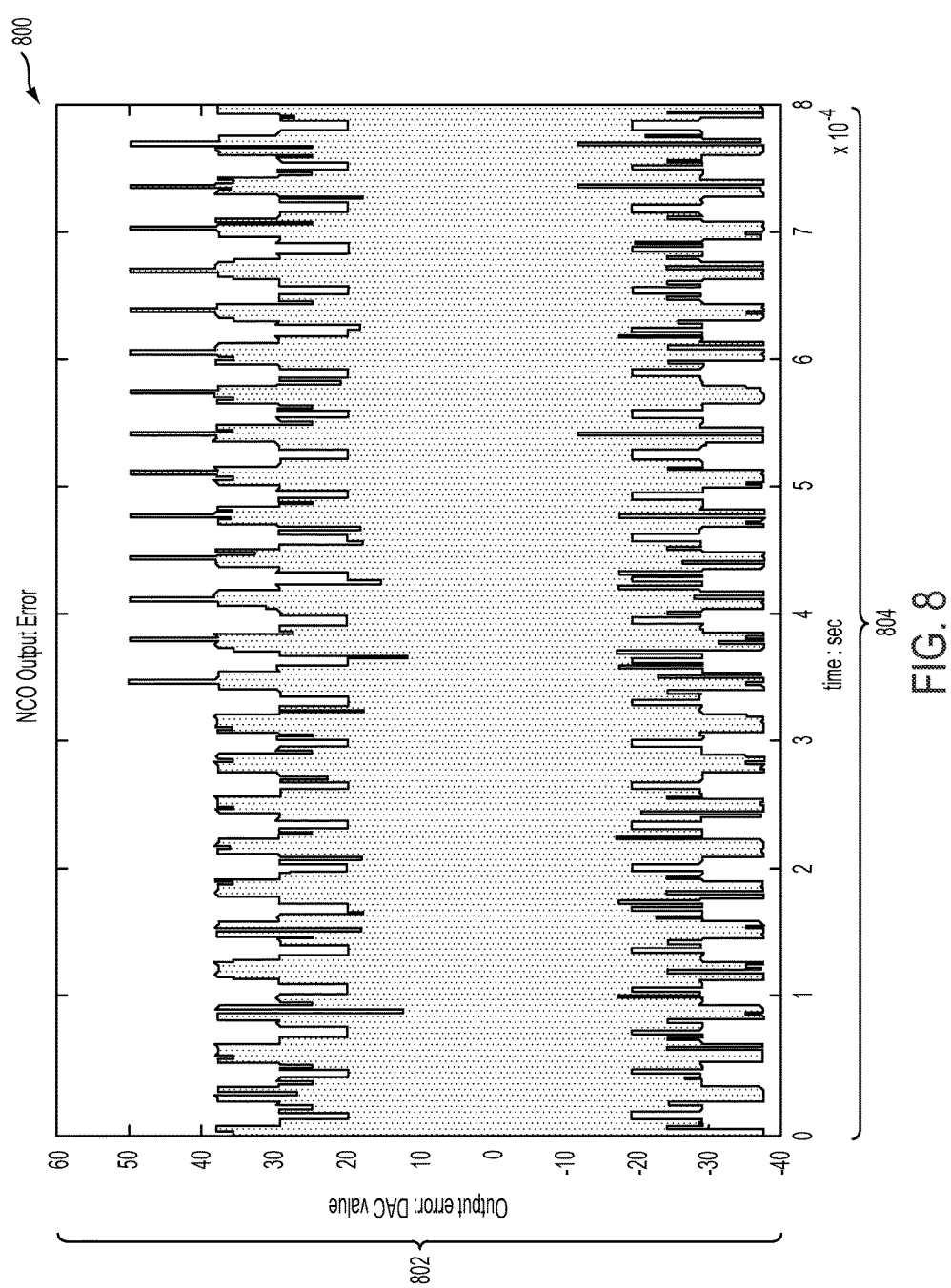
FIG. 8 shows NCO error with phase compensation, according to certain illustrative examples of the present disclosure.

FIG. 8 illustrates an NCO output error 800 (e.g., a phase error) that is limited or bounded by using a phase compensator. In the example of FIG. 8, the NCO output error 800 corresponds to an NCO with a phase compensator. The NCO output error 800 (e.g., the phase error) is bounded by upper and lower DAC values 802, and does not accumulate or increase over time 804. In one example, the NCO output error 800 is purely related to a fixed-point least significant bit (LSB).

Example of a Computer System Implementation

Figure 9:
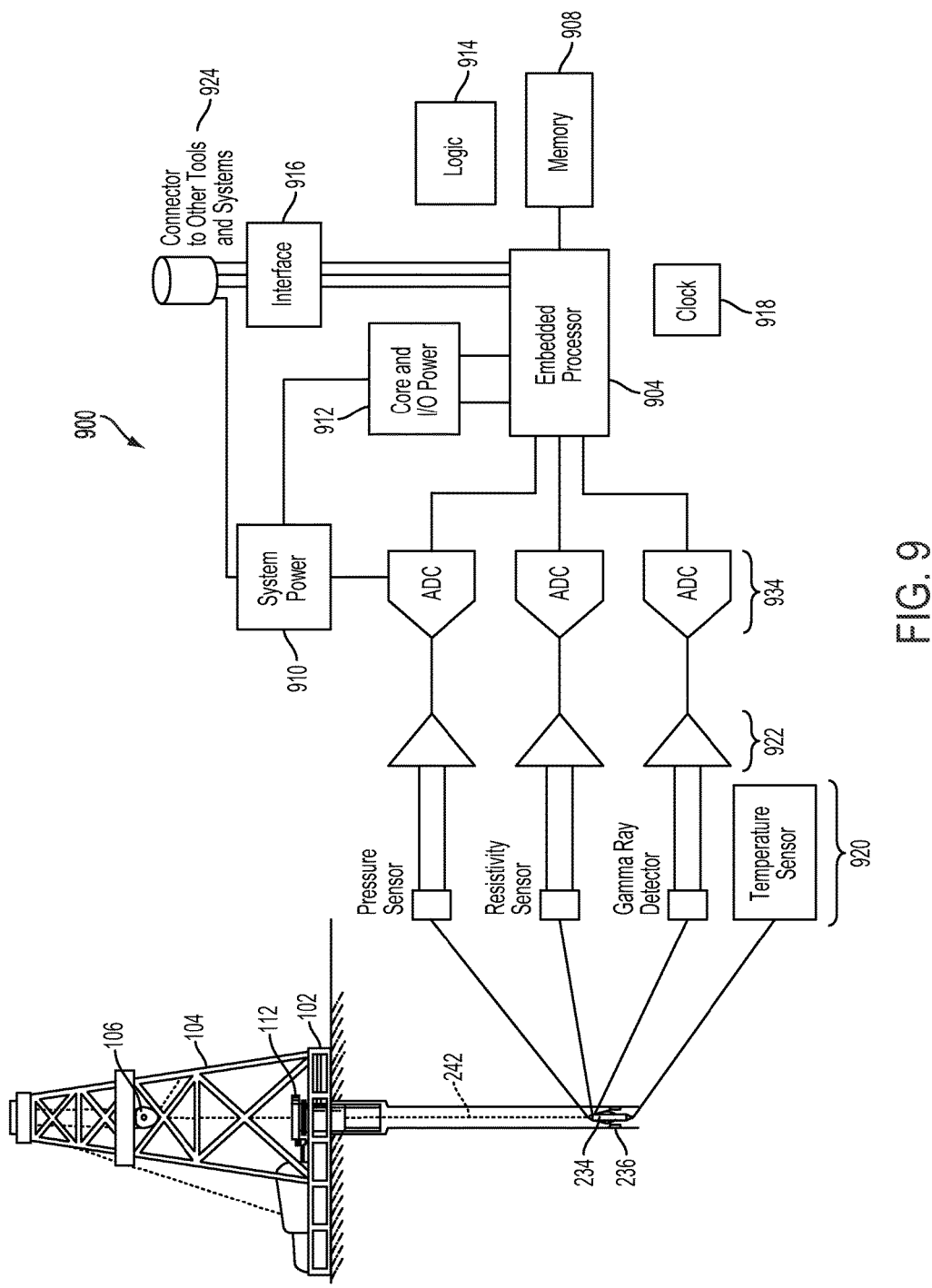
FIG. 9 is a block diagram of an embedded downhole computer system in which embodiments of the present disclosure can be implemented.

Although examples of embodiments have been described in terms of apparatuses, systems, services, and methods, it is contemplated that certain functionality described herein may be implemented in software on microprocessors, such as a microprocessor chip included in computing devices such as the embedded downhole computer system 900 illustrated in FIG. 9. In various embodiments, one or more of the functions of the various components may be implemented in software that controls a computing device, such as embedded computer system 900, which is described below with reference to FIG. 9.

To implement the various features and functions described above, some or all elements of the downhole tools (e.g., wireline logging tool 234 of FIG. 2, as shown), systems (e.g., system 300 of FIG. 3) and methods (e.g., method 400 of FIG. 4) may be implemented using elements of the computer system of FIG. 9. More particularly, FIG. 9 illustrates an example downhole computer system 900 for implementing the techniques in accordance with the present disclosure. In the example of FIG. 9, embodiments may be implemented in one or more of programmable logic 914, an embedded processor 904, and an integrated circuit such as an FPGA.

Aspects of the present disclosure shown in FIGS. 1-8, or any part(s) or function(s) thereof, may be implemented using hardware, software modules, firmware, tangible computer readable media having logic or instructions stored thereon, or a combination thereof and may be implemented in one or more computer systems or other processing systems.

FIG. 9 illustrates an example embedded downhole computer system 900 in which embodiments of the present disclosure, or portions thereof, may be implemented as computer-readable instructions or code. For example, some functionality performed with the system 300 shown in FIG. 3 can be implemented in the embedded computer system 900 using hardware, software, firmware, non-transitory computer readable media having instructions stored thereon, or a combination thereof and may be implemented in one or more computer systems or other processing systems. Hardware, software, or any combination of such may embody certain modules and components used to implement the system 300 illustrated by FIG. 3 discussed above. Similarly, hardware, software, or any combination of such may embody certain modules and components used to implement blocks in the flowchart illustrated by FIG. 4 discussed above.

If programmable logic is used, such logic may execute on a commercially available processing platform or a special purpose device. In the example of FIG. 9, programmable logic can be included in logic 914 of embedded downhole computing system 900. One of ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device.

For instance, at least one embedded processor 904 and a memory 908 may be used to implement the above described embodiments. Embedded processor 904 may be a single processor device, a plurality of processors, or combinations thereof. Processor devices may have one or more processor "cores."

Certain embodiments are described in terms of this example downhole computer system 900. After reading this description, it will become apparent to a person skilled in the relevant art how to implement the disclosed examples using other computer systems or computer architectures. Although operations may be described as a sequential process, some of the operations may in fact be performed in parallel, concurrently, or in a distributed environment, and with program code stored locally or remotely for access by single or multiprocessor machines. In addition, in some embodiments the order of operations may be rearranged without departing from the spirit of the disclosed subject matter.

Embedded processor 904 may be a special purpose or a general purpose processor device. As will be appreciated by persons skilled in the relevant art, embedded processor 904 may also be a single processor in a multi-core/multiprocessor system, such system operating alone, or in a cluster of computing devices operating in a cluster or server farm. Processor 904 is connected to a core power supply 912, which receives power from a system power supply 910. The power supply 910 can provide electrical power for electronics in the downhole computer system 900, such as signal converters 934, processor 904, input/output (I/O) devices, and other electronics. Non-limiting examples of the power supply 910 include batteries, capacitors, and an electrical connection to another power source located remotely. In some aspects, the power supply 910 may be omitted and power may be provided via an electric cable coupled to connector 924 or an electrical cable conveyed through the cable 242 that suspends wireline logging tool 234.

As shown in FIG. 9, downhole computer system 900 may include one or more sensors 920. In the example of FIG. 9, sensors 920 may include a temperature sensor, a pressure sensor, a resistivity sensor, and a gamma ray detector. Each of the sensors 920 can be connected to respective amplifiers 922. The amplifiers 922 can amplify sensor readings and signals output by sensors 920. The amplifiers 922 can be connected to one or more signal converters 934. Signal converters 934 can be analog to digital converters (ADC) or digital to analog converters (DAC), depending on the type of conversion needed. The signal converters 934 can receive power from system power 910. Converted signals output by signal converters 934 can be sent to processor 904. Embedded system 900 can also include a system clock 918.

In one embodiment, the frequency input 302 of system 300 described above with reference to FIG. 3 can be received via interface 916 shown in FIG. 9. According to an embodiment, a processor of system 300 described above with reference to FIG. 3 can be embodied as the processor 904 shown in FIG. 9.

Embedded downhole computer system 900 also includes a memory 908, for example, random access memory (RAM), a flash memory, or the like. In a non-limiting embodiment, storage used to store one or more of phase buffer 318, table index 330, and sine lookup table 332 of system 300 of FIG. 3 can be embodied as the memory 908 shown in FIG. 9. As will be appreciated by persons skilled in the relevant art, memory 908 may include a non-transitory computer readable storage medium having stored therein executable instructions, computer software, or data.

In alternative implementations, memory 908 may include other similar means for allowing logic 914, computer programs or other instructions to be loaded into embedded computer system 900. Such means may include, for example, interface 916 and connector 924. Examples of such means may include a removable memory chip (such as an EPROM, or EEPROM) and associated socket, and other removable storage units and interfaces 916 that allow software and data to be transferred from the removable storage units to downhole computer system 900.

Embedded downhole computer system 900 may also include interface 916. Interface 916 allows software and data to be transferred between embedded computer system 900 and external devices, tools and systems via connector 924. Interface 916 may include a modem, a network interface (such as an Ethernet card), a communications port, a PCMCIA slot and card, or the like. Software and data transferred via interface 916 and connector 924 may be in the form of signals, which may be electronic, electromagnetic, optical, or other signals capable of being received by interface 916. These signals may be provided to interface 916 via a communications path that carries signals and may be implemented using wire or cable, fiber optics, a phone line, a cellular phone link, an RF link or other communications channels.

As used herein the terms 'computer readable medium' and 'non-transitory computer readable medium' are used to generally refer to media, such as memory 908, which can include memory semiconductors (e.g., DRAMs, etc.). Computer readable medium and non-transitory computer readable medium can also refer to logic 914. Signals carried over a communications path including interface 916 and connector 924 can also embody the logic 914. These computer program products can be means for providing software to embedded downhole computer system 900.

Computer programs (also called computer control logic) may be stored in memory 908 or as part of logic 914. Computer programs may also be received via interface 916 and connector 924. Such computer programs, when executed, enable downhole computer system 900 to implement the present examples as discussed herein. In particular, the computer programs, when executed, enable embedded processor 904 to implement the processes of the present disclosure, such as the blocks in the method illustrated by the flowchart of FIG. 4, discussed above. Accordingly, such computer programs represent controllers of the embedded downhole computer system 900. Where features are implemented using software, the software may be stored in a computer program product and loaded into downhole computer system 900 using memory 908, interface 916, and connector 924.

As shown in FIG. 9, embedded computer system 900 can also include a core power supply 912 for supplying power to input/output (I/O) devices. The I/O devices can connect to interface 916 and connector 924 to receive input, such as, for example, user input specifying an error tolerance and other parameters and configuration settings.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the processes, methods and systems described herein may be embodied in a variety of other forms; furthermore, various omissions, substitutions and changes in the form of the processes, methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices. Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, blocks or steps. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Additionally, the use of "based on" is meant to be open and inclusive, in that a process, block, step, calculation, or other action "based on" one or more recited conditions or values may, in practice, be based on additional conditions or values beyond those recited.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Embodiments and methods described herein further relate to any one or more of the following paragraphs. As used below, any reference to a series of examples is to be understood as a reference to each of those examples disjunctively (e.g., "Examples 1-4" is to be understood as "Examples 1, 2, 3, or 4").

Example 1 is a system that includes a processor, a downhole device including a configuration module and a real-time module, and a memory having instructions stored thereon, that, if executed by the processor, cause the processor to perform operations. The operations include receiving parameters including an input frequency and a compensation value. The operations further include converting, with the configuration module, based on the parameters, the input frequency to a delta phase value. The operations also include calculating, with the real-time module, an accumulation error for a digital signal. Responsive to determining that the accumulation error is greater than or equal to the compensation value, the operations include removing the accumulation error from the digital signal to generate an output signal.

Example 2 is the system of Example 1, where the operations further include, prior to receiving the parameters, calculating, with the configuration module, the compensation value, wherein the compensation value corresponds to an error tolerance.

Example 3 is the system of Examples 1 or 2, where receiving parameters includes: receiving a system clock frequency; and calculating, with the configuration module, based on the parameters, configuration settings for the real-time module and an error tolerance for the output signal.

Example 4 is the system of Examples 1-3 where calculating the accumulation error includes converting, with the real-time module, the accumulation error into a running counter, and where the operations further include, responsive to determining that the accumulation error is less than the compensation value, incrementing, with the real-time module, the running counter.

Example 5 is the system of Examples 1-4 where receiving parameters is performed with the configuration module, and where the determining and the removing are performed with the real-time module.

Example 6 is the system of Examples 1-5 further including a digital-to-analog converter (DAC), where the operations further include converting, with the DAC, the output signal to generate an analog output signal.

Example 7 is a method that includes receiving, at a downhole device, parameters including an input frequency and a compensation value. The method converts, based on the parameters, the input frequency to a delta phase value. The method further includes calculating, with the downhole device, an accumulation error for a digital signal. In response to determining that the accumulation error is greater than or equal to the compensation value, the method removes the accumulation error from the digital signal to generate an output signal.

Example 8 is the method of Example 7, where the compensation value is a pre-determined value corresponding to a calculated error tolerance for the output signal.

Example 9 is the method of Examples 7 or 8 where the method further includes, prior to receiving parameters, calculating, with a configuration module of the downhole device, the compensation value, wherein the compensation value corresponds to an error tolerance.

Example 10 is the method of Examples 7-9 where receiving parameters includes: receiving a system clock frequency; and calculating, with a configuration module, based on the parameters, configuration settings for a real-time module of the downhole device and an error tolerance for the output signal.

Example 11 is the method of Examples 7-10 where calculating the accumulation error includes converting, with a real-time module of the downhole device, the accumulation error into a running counter, and where the method further includes, responsive to determining that the accumulation error is less than the compensation value, incrementing, with the real-time module, the running counter.

Example 12 is the method of Examples 7-11 where receiving parameters and converting the input frequency are performed with a configuration module, and where the calculating, the determining, and the removing are performed with a real-time module.

Example 13 is the method of Examples 7-12 where generating the output signal includes: converting the delta phase value to an integer value; searching for the integer value in a sine lookup table to determine a sine value for the digital signal; converting the digital signal to an analog signal using a digital-to-analog converter (DAC); and providing the analog signal as the output signal.

Example 14 is the method of Examples 7-13 where the calculating and the removing are performed with a phase compensator including a compensation register and a compensation counter.

Example 15 is a computer readable storage medium that has executable instructions stored thereon. If the instructions are executed by a downhole device, the instructions cause the downhole device to perform operations. The instructions include: instructions for receiving parameters including an input frequency and a compensation value; and instructions for converting, based on the parameters, the input frequency to a delta phase value. The instructions further include instructions for calculating an accumulation error for a digital signal. In response to determining that the accumulation error is greater than or equal to the compensation value, the instructions also include instructions for removing the accumulation error from the digital signal to generate an output signal.

Example 16 is the storage medium of Example 15, where the compensation value is a pre-determined value corresponding to a calculated error tolerance for the output signal.

Example 17 is the storage medium of Examples 15 or 16, where the instructions for receiving parameters include: instructions for receiving a system clock frequency; and instructions for calculating, with a configuration module, based on the parameters, configuration settings for a real-time module and an error tolerance for the output signal.

Example 18 is the storage medium of Examples 15-17 where the instructions for calculating include instructions for converting, with a real-time module, the accumulation error into a running counter.

Example 19 is the storage medium of Examples 15-18 where the instructions further include instructions for incrementing, with the real-time module, the running counter, in response to determining that the accumulation error is less than the compensation value.

Example 20 is the storage medium of Examples 15-19 where the instructions for generating the output signal include: instructions for converting the delta phase value to an integer value; instructions for searching for the integer value in a sine lookup table to determine a sine value for the digital signal; instructions for converting the digital signal to an analog signal using a digital-to-analog converter (DAC); and instructions for providing the analog signal as the output signal.

What is claimed is:

1. A system comprising:
a processor;
a downhole device including a configuration module and a real-time module; and
a memory having instructions stored thereon, that, if executed by the processor, cause the processor to perform operations comprising:
receiving parameters including an input frequency and a compensation value;
converting, with the configuration module, based on the parameters, the input frequency to a delta phase value;
calculating, with the real-time module, an accumulation error for a digital signal;
responsive to determining that the accumulation error is greater than or equal to the compensation value, removing the accumulation error from the digital signal to generate an output signal.

2. The system of claim 1, the operations further comprising, prior to receiving parameters, calculating the compensation value with the configuration module, wherein the compensation value corresponds to an error tolerance.

3. The system of claim 1, wherein receiving parameters comprises:
receiving a system clock frequency; and
calculating, with the configuration module, based on the parameters, configuration settings for the real-time module and an error tolerance for the output signal.

4. The system of claim 1, wherein calculating the accumulation error includes converting, with the real-time module, the accumulation error into a running counter, the operations further comprising:
responsive to determining that the accumulation error is less than the compensation value, incrementing, with the real-time module, the running counter.

5. The system of claim 1, wherein receiving parameters is performed with the configuration module, and wherein the determining and the removing are performed with the real-time module.

6. The system of claim 1, further comprising a digital-to-analog converter (DAC), the operations further comprising converting, with the DAC, the output signal to generate an analog output signal.

7. A method comprising:
receiving, at a downhole device, parameters including an input frequency and a compensation value;
converting, based on the parameters, the input frequency to a delta phase value;
calculating, with the downhole device, an accumulation error for a digital signal; and
responsive to determining that the accumulation error is greater than or equal to the compensation value, removing the accumulation error from the digital signal to generate an output signal.

8. The method of claim 7, wherein the compensation value is a pre-determined value corresponding to a calculated error tolerance for the output signal.

9. The method of claim 7, further comprising, prior to receiving parameters, calculating, with a configuration module of the downhole device, the compensation value, wherein the compensation value corresponds to an error tolerance.

10. The method of claim 7, wherein receiving parameters comprises:
receiving a system clock frequency; and
calculating, with a configuration module, based on the parameters, configuration settings for a real-time module of the downhole device and an error tolerance for the output signal.

11. The method of claim 7, wherein calculating the accumulation error includes converting, with a real-time module of the downhole device, the accumulation error into a running counter, the method further comprising:
responsive to determining that the accumulation error is less than the compensation value, incrementing, with the real-time module, the running counter.

12. The method of claim 7, wherein receiving parameters and converting the input frequency are performed with a configuration module, and wherein the calculating, the determining, and the removing are performed with a real-time module.

13. The method of claim 7, wherein generating the output signal comprises:
converting the delta phase value to an integer value;

searching for the integer value in a sine lookup table to determine a sine value for the digital signal;
converting the digital signal to an analog signal using a digital-to-analog converter (DAC); and
providing the analog signal as the output signal.

14. The method of claim 7, wherein the calculating and the removing are performed with a phase compensator including a compensation register and a compensation counter.

15. A memory having executable instructions stored therein, that, if executed by a downhole device, cause the downhole device to perform operations, the instructions comprising:
instructions for receiving parameters including an input frequency and a compensation value;
instructions for converting, based on the parameters, the input frequency to a delta phase value;
instructions for calculating an accumulation error for a digital signal; and
responsive to determining that the accumulation error is greater than or equal to the compensation value, instructions for removing the accumulation error from the digital signal to generate an output signal.

16. The memory of claim 15, wherein the compensation value is a pre-determined value corresponding to a calculated error tolerance for the output signal.

17. The memory of claim 15, wherein the instructions for receiving parameters comprise:

instructions for receiving a system clock frequency; and
instructions for calculating, with a configuration module, based on the parameters, configuration settings for a real-time module and an error tolerance for the output signal.

18. The memory of claim 15, wherein the instructions for calculating comprise instructions for converting, with a real-time module, the accumulation error into a running counter.

19. The memory of claim 18, the instructions further comprising:
responsive to determining that the accumulation error is less than the compensation value, instructions for incrementing, with the real-time module, the running counter.

20. The memory of claim 15, wherein the instructions for generating the output signal comprise:
instructions for converting the delta phase value to an integer value;
instructions for searching for the integer value in a sine lookup table to determine a sine value for the digital signal;
instructions for converting the digital signal to an analog signal using a digital-to-analog converter (DAC); and
instructions for providing the analog signal as the output signal.

* * * * *